US011249828B1

(12) United States Patent
Hufnagel

(10) Patent No.: US 11,249,828 B1
(45) Date of Patent: Feb. 15, 2022

(54) SIMULATION SERVICE PROVIDING A GENERIC API ENDPOINT

(71) Applicant: SAP SE, Walldorf (DE)

(72) Inventor: Frank Hufnagel, Leimen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/112,598

(22) Filed: Dec. 4, 2020

(51) Int. Cl.
*G06F 9/54* (2006.01)
*H04L 29/08* (2006.01)

(52) U.S. Cl.
CPC .............. *G06F 9/547* (2013.01); *H04L 67/02* (2013.01)

(58) Field of Classification Search
CPC ........... G06F 9/541; G06F 9/547; H04L 67/02
See application file for complete search history.

(56) References Cited

U.S. PATENT DOCUMENTS

| 11,115,502 B1 * | 9/2021 | Shah | ................... H04L 67/1002 |
| 2012/0180029 A1 * | 7/2012 | Hill | ........................... G06F 8/70 717/135 |
| 2017/0286267 A1 * | 10/2017 | Jain | ..................... G06F 11/3688 |
| 2017/0300402 A1 * | 10/2017 | Hoffner | ............... G06F 11/3664 |
| 2020/0242020 A1 * | 7/2020 | Bates | .................. G06F 11/3664 |
| 2020/0349058 A1 * | 11/2020 | Tuttle | .................... G06F 11/302 |

OTHER PUBLICATIONS

Wikipedia, "Representational state transfer," <https://en.wikipedia.org/wiki/Representational_state_transfer>, 7 pages (accessed Nov. 19, 2020).

* cited by examiner

*Primary Examiner* — Brian W Wathen
(74) *Attorney, Agent, or Firm* — Klarquist Sparkman, LLP

(57) ABSTRACT

Technologies are described for simulating requests to back-end applications using a generic application programming interface (API). The requests can be received, from frontend web applications, by a simulation service that operates the generic API. For example, the simulation service can receive and process actions to create entries for entities, actions to return entries for entities, actions to delete entries for entities and/or other actions. The simulation service can perform the requested actions and return results. The simulation service can support arbitrary entities and entity and without using definitions of predefined entities or properties.

20 Claims, 7 Drawing Sheets

SIMULATION SERVICE PROVIDING A GENERIC API ENDPOINT

BACKGROUND

Developing a modern web application requires a significant amount of testing. In a typical development scenario, a frontend web application is developed separately from the corresponding backend application. However, part of development and testing of the frontend web application involves communication between the frontend web application and the corresponding backend application. This can be difficult if the backend application does not yet exist or is not developed enough to exchange messages with the frontend web application.

In typical development scenarios, testing of the frontend web application proceeds using predefined responses. For example, a particular communication between the frontend web application and the backend application can be tested by providing a predefined response to the frontend web application. While such predefined responses can be helpful during testing of the frontend web application, they suffer from a number of limitations. One limitation is that a predefined response can only test for the specific test case represented by the predefined response. For example, if the data format of an entity of the frontend web application changes, the predefined response may not be usable or may not adequately test the functionality of the frontend web application. Another limitation is that a predefined response is processed faster than a normal response would be (e.g., without having to actually send a message to the backend application, which involves network communication, data storage access, etc.), and therefore may be unable to identify issues that arise in real-world situations (e.g., issues involving loading time, network delays, etc.).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for simulating requests to backend applications using a generic application programming interface (API). The requests can be received, from frontend web applications, by a simulation service that operates the generic API. For example, the simulation service can receive and process actions to create entries for entities, actions to return entries for entities, actions to delete entries for entities and/or other actions. The simulation service can perform the requested actions and return results. The simulation service can support arbitrary entities and properties. In addition, the simulation service does not use predefined responses as the entities and properties are not predefined.

DETAILED DESCRIPTION

Overview

Figure 1:
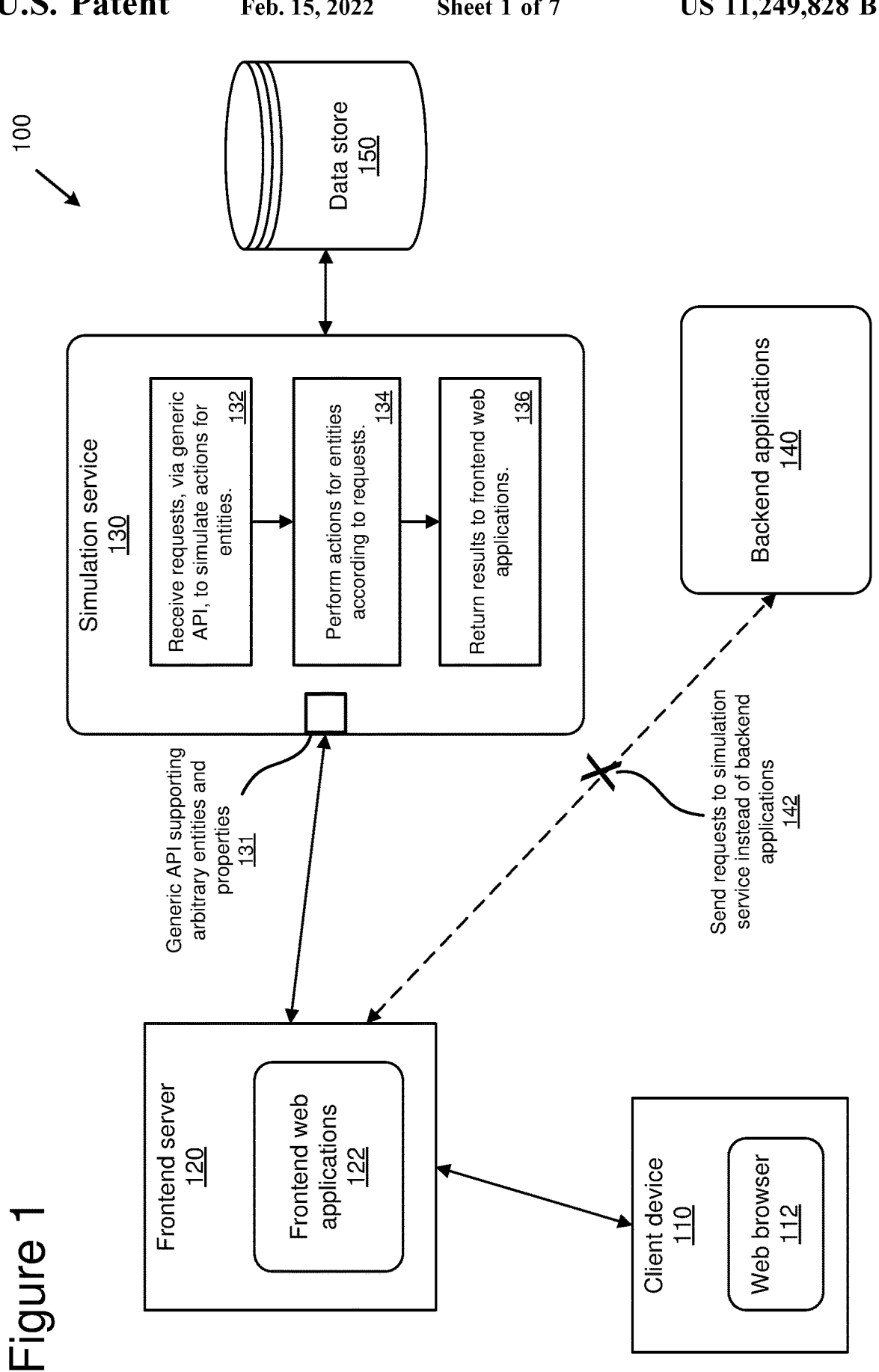
FIG. 1 is an example environment that provides a simulation service with a generic application programming interface (API) that simulates requests to a backend application.

The following description is directed to technologies for simulating requests to backend applications using a generic application programming interface (API). The requests can be received, from frontend web applications, by a simulation service that operates the generic API. For example, the simulation service can receive and process actions to create entries for entities, actions to return entries for entities, actions to delete entries for entities and/or other actions. The simulation service can perform the requested actions and return results. The simulation service can support arbitrary entities and properties, without using definitions of predefined entities or properties. Because the simulation service supports arbitrary entities and properties, it does not use predefined responses.

In some implementations, a first request is received, from a frontend web application via the generic API, to simulate an action to create an entry for an entity. The first request comprises a type of the entity and one or more properties for the entity. In response to the first request, the entry for the entity (comprising the one or more properties) is created and stored in a data store. A second request is then received to retrieve the entry for the entity. In response, the entry for the entity is retrieved form the data store (including the one or more properties) and returned to the frontend web application.

The generic API allows the frontend web applications to test functionality without having to send requests to the backend applications. Instead, the frontend web applications use the generic API, which operates as a backend service separate from the backend applications, to test the functionality. In other words, the generic API can be used to simulate requests that would normally be sent to the backend applications. The generic API supports arbitrary entities and arbitrary properties of the entities. This technology allows the generic API to support any type of entity with any properties. Because the generic API works with arbitrary entities and properties, the generic API does not use definitions of predefined entities or properties.

Typical web service solutions involve frontend web applications and backend applications. The frontend web applications communicate with web browsers running on client devices (e.g., personal computers, tablets, smart phones, and/or other types of client computing devices). For example, the frontend web applications serve web pages that are accessed by the web browsers running on the client devices. The frontend web applications communicate with backend applications. The backend applications provide data storage (e.g., databases) and other backend computing services. For example, in the context of a financial services application, the frontend web applications can provide user interfaces allowing users to create various entities (e.g., invoices, receipts, purchase orders, etc.). The frontend web applications can communicate with the backend applications to carry out processing for the various entities (e.g., process and store invoices, perform financial transactions, etc.).

In typical software development scenarios, the frontend web applications are developed separately from the backend applications. This situation can create problems when developing and testing the frontend web applications. This can occur when the frontend web applications are developed before the backend applications exist, or when the backend applications are under development but not yet ready to receive and process requests from the frontend web applications. This situation can result in delays during software development (e.g., development of the frontend web applications may have to be delayed until backend application development is completed). While predefined responses can be used to test the frontend web applications independent of the backend limitations, testing using predefined responses (e.g., predefined entities and properties) provides limited benefit.

The technologies described herein provide improvements over such typical software development scenarios. For example, a generic API (e.g., as a backend service) can be provided allowing the frontend web applications to simulate requests to the backend applications without sending requests to the backend applications. In other words, the generic API (e.g., as part of a simulation service) can receive, process, and/or respond to requests from the frontend web applications without the backend applications being involved. This technology can provide a flexible and efficient solution to development, including testing, of the frontend web applications because the backend applications do not have to be involved (e.g., they can be developed later or independently). The generic API can also support simulation of any type of request. For example, the frontend web applications can send any type of data to the generic API (e.g., any type of entities with any type of properties). By supporting arbitrary data (e.g., arbitrary entities and properties), the generic API does not use any predefined definitions of the data (e.g., predefined definitions of entities and properties are not used). This allows the generic API to be used by any type of frontend web application (e.g., regardless of whether the frontend web applications are part of a financial services solution dealing with financial data, a human resources solution dealing with human resources data, etc.).

Example Environments Providing Simulation Services with Generic APIs

In the technologies described herein, environments can be provided that include simulation services with generic APIs that simulate requests to backend applications. The environments can be used when developing and/or testing frontend web applications. Instead of sending requests to the backend applications, requests can be sent to the simulation services. The simulation services simulate processing of the requests that would otherwise be sent to the backend applications and without using predefined responses.

FIG. 1 depicts an example environment 100 that provides a simulation service with a generic API that simulates requests to a backend application. The example environment 100 includes client device 110. Client device 110 can be a computer (e.g., laptop or desktop computer), a tablet, a smart phone, or another type of computing device. There is a web browser 112 running on client device 110. A user of client device 110 uses the web browser 112 to access front end web applications 122. The frontend web applications 122 run on a frontend server 120 (e.g., a physical or virtual computer server). For example the frontend web applications 122 could be the frontend to a customer relationship management (CRM) application, a human resources (HR) application, a financial management application, and/or any other type of software application that is accessible to users via a web frontend. While the example environment 100 only depicts one client device 110 and one frontend server 120, an environment can have any number of client devices and frontend servers.

In a production environment, the frontend web applications 122 communicate with the backend applications 140 in order to perform various activities. For example, in the context of a human resources application, the frontend web applications 122 can provide user interfaces for creating, editing, and deleting employees (e.g., accessed by the user of client device 110 via web browser 112). The frontend web applications 122 communicate with the backend applications 140 to carry out the activities. For example, the frontend web applications 122 send messages to the backend applications to create, edit, and delete employees (e.g., the backend applications 140 maintain the human resources databases storing the employee information). The backend applications 140 run on computing devices (not depicted), such as physical or virtual servers.

However, during development of the frontend web applications 122, the backend applications 140 may not be available. For example, the frontend web applications 122 may be developed before the backend applications exist 140, or the backend applications 140 may be under development but not yet ready to accept requests from the frontend applications 122. There may also be other situations where the frontend web applications 122 needs to be tested independent of the backend applications 140.

The example environment 100 includes simulation service 130. Simulation service 130 includes a generic API 131. The generic API 131 supports arbitrary entities and properties. The frontend web applications 122 use the generic API 131 to simulate requests to the backend applications 140. In other words, the simulation service 130 provides a service endpoint (accessed via the generic API 131) for receiving and processing requests from the frontend web applications 122. In this way, the frontend web applications 122 can test functionality that would otherwise need to communicate with the backend applications 140 by using the generic API 131 of the simulation service 130 without actually communicating with the backend applications 140 (i.e., the frontend web applications 122 send requests directly to the simulation service 130 instead of to the backend applications 140, as depicted at 142). In some implementations, the simulation service 130, and the generic API 131, operate as a backend service (e.g., operating at a backend environment along with the backend applications 140).

In some implementations, the simulation service 130 performs operations to simulate actions that would otherwise be performed by the backend applications 140. For example, the simulation service 130 receives requests, via the generic API 131, to simulate actions for entities, as depicted at 132. The actions could include actions to create entries for entities, actions to retrieve entries for entities, actions to update entries for entities, and/or actions to delete entries for entities. As depicted at 134, the simulation service 130 performs the actions for the entities according to the requests. For example, if the request is to create an entry for an entity, then the simulation service 130 creates the entry and stores it in the data store 150. As depicted at 136, the simulation service 130 returns results of performing the actions to the frontend web applications 122. For example, if the request is to create an entry for an entity, then the result can be an indication that the entry was created (e.g., comprising a unique identifier for the created entry for the entity).

The data store 150 stores entries for entities. The data store can store the entries using any type of data storage technology. For example, the data store 150 can be implemented as a relational database, as a flat file database, as a collection of folders and files in a file system, or as another type of data store.

The simulation service 130 and data store 150 are implemented using computing resources (e.g., server resources, database resources, and/or other types of computing resources). The simulation service 130 and/or data store 150 can be hosted on the same computing resources as the backend applications 140 or on different computing resources. In some implementations, the simulation service 130 and the backend applications 140 operate at the same backend environment, and may run on the same computing resources (e.g., the same servers) or different computing resources (e.g., different servers) at the backend environment.

Using the technologies described herein, a generic API (e.g., generic API 131 operated as part of simulation service 130) can support requests from frontend web applications (e.g., frontend web applications 122) to perform a variety of actions. The actions can include a create action that creates and stores an entry for an entity in a data store (e.g., in data store 150). For example, the create action can be received as a request comprising a type of the entity (also referred to as the entity name) and one or more properties of the entity. Performing the create action can comprise generating a unique identifier for the entry and storing the entry, in association with its unique identifier, in the data store.

The actions can also include a return action that returns an entry for an entity. For example, the return action can be received as a request that comprises a unique identifier for a specific entry of a specific entity. The specific entry (e.g., comprising one or more properties) can be obtained (e.g., from the data store) and returned to the frontend web applications. In some implementations, there are two types of return actions. The first type of return action returns a specific entry for a specific entity (e.g., identified by its unique identifier). For example, there may be multiple invoice entries stored in the data store (i.e., multiple entries of the same type of entity, which in this example is the "invoice" type), each associated with its respective unique identifier. The return action can identify one of the entries by its unique identifier and retrieve it. The second type of return action returns all entries having the same entity type. For example, this type of return action can identify the "invoice" type and retrieve all entries having that entity type (e.g., all entries along with their associated properties).

The actions can also include a delete action that deletes an entry for an entity. For example, the delete action can be received as a request that comprises a unique identifier for a specific entry for a specific entity. By processing this request, the specific entry, including its associated properties, can be deleted from the data store.

The actions can also include an update action that updates properties for a specific entry of a specific entity (e.g., identified by its unique identifier). The update action could update just the properties sent in the request, or all properties.

In some implementations, the generic API (e.g., generic API 131) receives hypertext transfer protocol (HTTP) requests from the frontend web applications (e.g., from frontend web applications 122). In some implementations, the type of the entity is received in a path segment of a uniform resource locator (URL) of the HTTP request. A path segment is a portion of the URL separated by slashes. For example, the URL could be http://example.org/api/employee. The entity type in this example is "employee," which is identified by the path segment "/employee." Using the URL path segment in this way, any arbitrary entity type can be identified. In some implementations, a username is included in the URL to identify the user that is accessing the generic API (e.g., http://username example.org/api/employee).

In some implementations, the generic API (e.g., generic API 131) is hosted as representational state transfer (RESTful) web service that receives HTTP requests from the frontend web applications (e.g., from frontend web applications 122). In the RESTful implementation, the type of the entity is received in a path segment of a uniform resource locator (URL) of the HTTP request. In addition, the indication of the action to perform is determined by a request method of the HTTP request, with different request methods indicating different actions. For example, a first request method (e.g., the GET request method) can indicate an action to retrieve an entry for an entity, a second request method (e.g., the POST request method) can indicate an action to create an entry for an entity, a third request method (e.g., the DELETE request method) can indicate an action to delete an entry for an entity, a fourth request method (e.g., the PATCH request method) can indicate an action to update specific properties for an entry for an entity, a fifth request method (e.g., the PUT request method) can indicate an action to update all properties for an entry for an entity, and so on. As an example, a RESTful implementation receives an HTTP request specifying the GET request method with a URL of http://example.org/api/employee/12345. This example request would retrieve the entry for the employee entity with a unique identifier of 12345 and return the entry (e.g., return the properties associated with the entry).

The entries for the entities are stored in a data store, such as data store 150. The data store can be implemented as a relational database, as a flat file database, as a collection of folders and files in a file system, or as another type of data store. In an example implementation that uses a relational database to store the entries for the entities, the relational database comprises three tables. The first table is called an Entity Type table and contains an Entity_Type_ID field (a unique key for the first table) and a Name field (the entity type or entity name) The second table is called an Entities table and contains an Entity_ID field (a unique key for the second table and also the unique identifier for each entity entry) and an Entity_Type_ID field (a foreign key relationship to the Entity_Type_ID field of the first table). The third table is called an Entity Properties table and contains an ID field (a unique key for the third table), an Entity_ID field (a foreign key relationship to the Entity_ID field of the second table), a Type field (indicating a data type for the property, such as string, int, etc.), a Property field (indicating the name of the property), and a Value field (indicating the contents, or value, of the property). The following three tables contain example entries for entities using the example relational database schema. Table 1 contains data for the Entity Type table, Table 2 contains data for the Entities table, and Table 3 contains data for the Entity Properties table.

As depicted below, Table 1 stores three entity types.

TABLE 1

Entity Type

| Entity_Type_ID | Name |
|---|---|
| 1 | Users |
| 2 | Tags |
| 3 | Articles |

As depicted below, Table 2 contains six entries for six entities. The first four entries have the same entity type, which is the "Tags" entity type. The fifth and sixth entries have the same entity type, which is the "Articles" entity type.

TABLE 2

Entities

| Entity_ID | Entity_Type_ID |
|---|---|
| 1 | 2 |
| 2 | 2 |
| 3 | 2 |
| 4 | 2 |
| 5 | 3 |
| 6 | 3 |

As depicted below, Table 3 contains properties for the entries of the entities. For example, the entity with the Entity_ID of 5 (an Articles type entity) has three properties (Title and Content) and the entity with the Entity_ID of 6 (an Articles type entity) has three properties (Title, Content, and Author).

TABLE 3

Entity Properties

| ID | Entity_ID | Type | Property | Value |
|---|---|---|---|---|
| 1 | 1 | String | Name | Programming |
| 2 | 1 | Date | Created | 2020-11-16 |
| 3 | 2 | String | Name | Demo |
| 4 | 2 | String | Created | 2020-11-16 |
| 5 | 3 | String | Name | Hello |
| 6 | 4 | String | Name | World |
| 7 | 5 | String | Title | My article |
| 8 | 5 | String | Content | This is the article content |
| 9 | 6 | String | Title | My second article |
| 10 | 6 | String | Content | This is more content |
| 11 | 6 | String | Author | User 1 |

The above relational database example represents just one way of storing the entries for the entities. Other types of relational database schemas can be used as can other types of data stores. For example, in some implementations a file-based storage structure is used. The file-based structure contains folders, each folder containing entities of a given type (e.g., a first folder for Users, a second folder for Tags, a third folder for Articles, and so on). Each entity is represented by a file in a given folder (e.g., a first Article file in the Articles folder contains the properties for the first Article entity, and so on).

Figure 2:
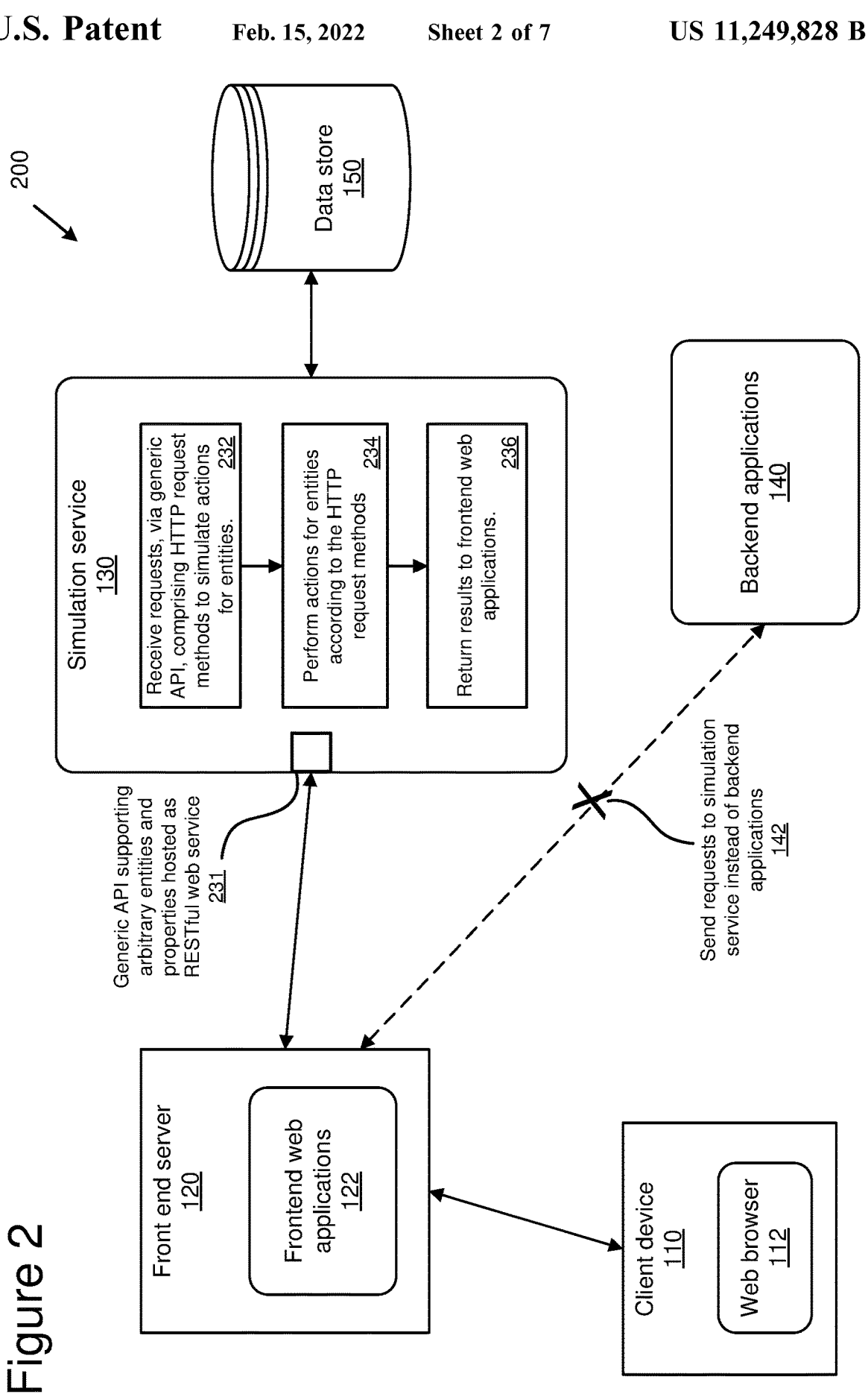
FIG. 2 is an example environment that provides a simulation service with a generic API hosted as a representational state transfer (RESTful) web service.

FIG. 2 depicts an example environment 200 that provides a simulation service with a generic API, implemented as a RESTful web service, that simulates requests to a backend application. The example environment 200 is similar to example environment 100, except that the generic API is implemented as a RESTful web service, as depicted at 231.

In some implementations, the simulation service 130 performs operations to simulate actions that would otherwise be performed by the backend applications 140. For example, the simulation service 130 receives requests, via the generic API implemented as a RESTful web service 231, to simulate actions for entities, as depicted at 232. The requests are received as HTTP requests where the request method indicates the action to perform (e.g., the POST request method indicates an action to create an entry, the GET request method indicates an action to retrieve an entry, and so on). The actions can include actions to create entries for entities, actions to retrieve entries for entities, actions to update entries for entities, and/or actions to delete entries for entities. As depicted at 234, the simulation service 130 performs the actions for the entities according to the HTTP request methods. For example, if the request is to create an entry for an entity, then the simulation service 130 creates the entry and stores it in the data store 150. As depicted at 236, the simulation service 130 returns results of performing the actions to the frontend web applications 122. For example, if the request is to create an entry for an entity, then the result can be an indication that the entry was created (e.g., comprising a unique identifier for the created entry for the entity).

Example RESTful Implementation

The following is an example RESTful implementation of a simulation service for simulating requests to backend applications. The example RESTful implementation can be implemented by a simulation service, such as simulation service 130.

In the example RESTful implementation, requests are received as HTTP request with the entity type indicated by a URL path segment and the action indicated by the HTTP request method. An example request according to the implementation has the following HTTP URL format: http://<username><hostname>/api. In this example format, the username represents a user of the simulation service. The "/api" path segment identifies the generic API.

The following table, Table 4, depicts the actions that can be performed in the example RESTful implementation along with their associated request methods and URL format. Different implementations can use different request methods and/or assign different actions to the request methods.

TABLE 4

HTTP Request Methods

| HTTP request method | URL format | Action |
|---|---|---|
| GET | /api/<entity type> | Return all entries for entities having the entity type |
| GET | /api/<entity type>/<id> | Return the entry for the entity having the unique identifier |
| POST | /api/<entity type> | Create a new entry for an entity having the entity type |
| DELETE | /api/<entity type>/<id> | Delete the entry for the entity having the unique identifier |
| PATCH | /api/<entity type>/<id> | Update only the sent properties |

TABLE 4-continued

HTTP Request Methods

| HTTP request method | URL format | Action |
|---|---|---|
| | | of the entry for the entity having the unique identifier |
| PUT | /api/<entity type>/<id> | Update all properties of the entry for the entity having the unique identifier |

In the example RESTful implementation, the properties are sent in the request body. For example, a request to create an entry for an entity of type "article" can be represented by the following HTTP request:
URL: http://username.example.org/api/article
Request method: POST
Request body:
{
  name: "Test"
  text: "Content for article."
}

In the example HTTP request above, the request body contains two properties for the article entry, a name property (with the value of "Test") and a text property (with the value of "Content for article.").

In response to the example HTTP request above, the simulation service can return an HTTP response. The following example HTTP response can be returned.
Response body:
{
  unique identifier: "12345-678"
  name: "Test"
  text: "Content for article."
}

In the example HTTP response above, the simulation service returns a unique identifier for the created entry for the article entity. The created entry is uniquely identified by the unique identifier "12345-678" (e.g., corresponding to the Entity_ID field in the example relational database tables above). In this example, the properties are returned as well. However, in different implementations, different and/or other information could be returned (e.g., just the unique identifier without properties, an indication that the entry was created successfully, etc.).

The URL format depicted in Table 4 is just an example, and different implementations can use different URL formats. For example, the "/api" path segment could be left out or a different path segment could be used. The username could be left out or could be sent in a different manner (e.g., as part of the request body). The entity type could also be provided in the request body instead of as a path segment.

Example Service Flows

Figure 3:
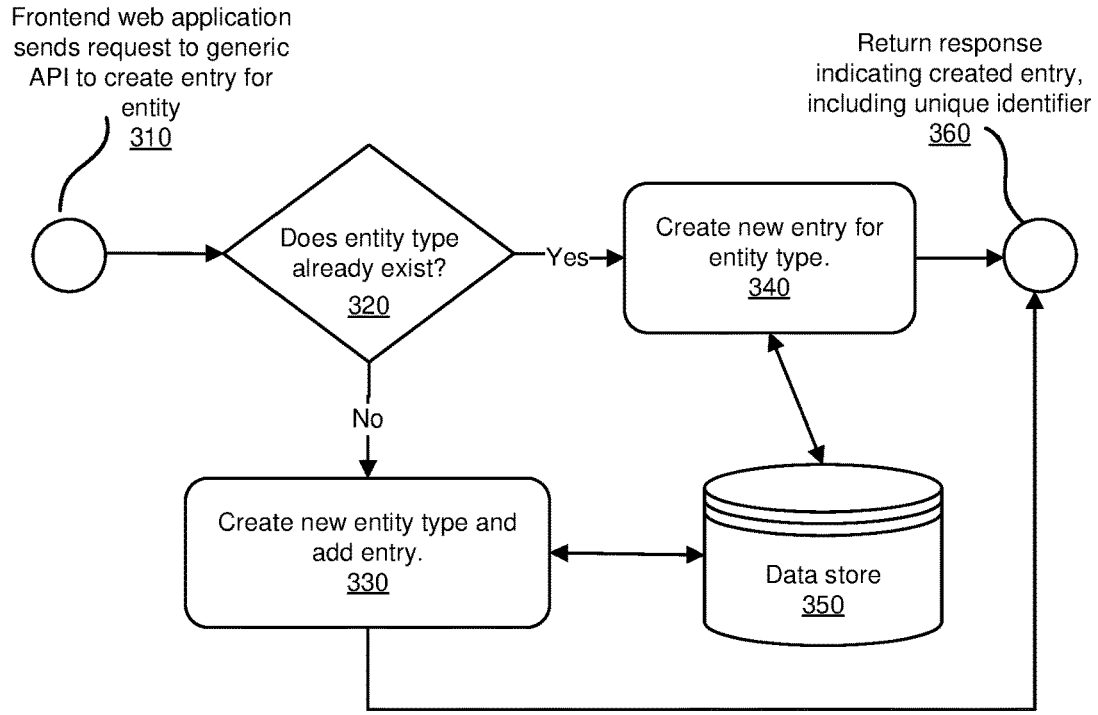
FIG. 3 is a diagram depicting an example service flow for creating entries for entities using a generic API.

FIG. 3 is a diagram depicting an example service flow 300 for creating entries for entities using a generic API (e.g., using generic API 131 or 231) of a simulation service (e.g., simulation service 130). The example service flow 300 begins when a frontend web application sends a request to the generic API to create an entry for an entity, as depicted at 310. When the request is received, a check is made to determine whether the entity type already exists, as depicted at 320. If the entity type does not exist, then the service flow proceeds to 330, where a new entity type and a new entry are created. For example, the entity type can be created in the data store 350 and a new entry can be added for the entity. In some implementations, checking whether the entity type already exists is performed by checking a relational database table for a record matching the entity type (e.g., checking for an entry in a table such as Table 1 above). If the entity type is not present in the relational database table, then a record is added for the entity type and corresponding entry (e.g., added to tables, such as Table 1 and Table 2 above). The entity properties are also stored (e.g., in a table such as Table 3 above). If the entity type does exist, then the service flow proceeds to 340 where the new entry is created for the entity and stored in the data store 350. For example, the entry can be stored by storing the data in relational database tables (e.g., such as Tables 2 and 3 above).

Figure 4:
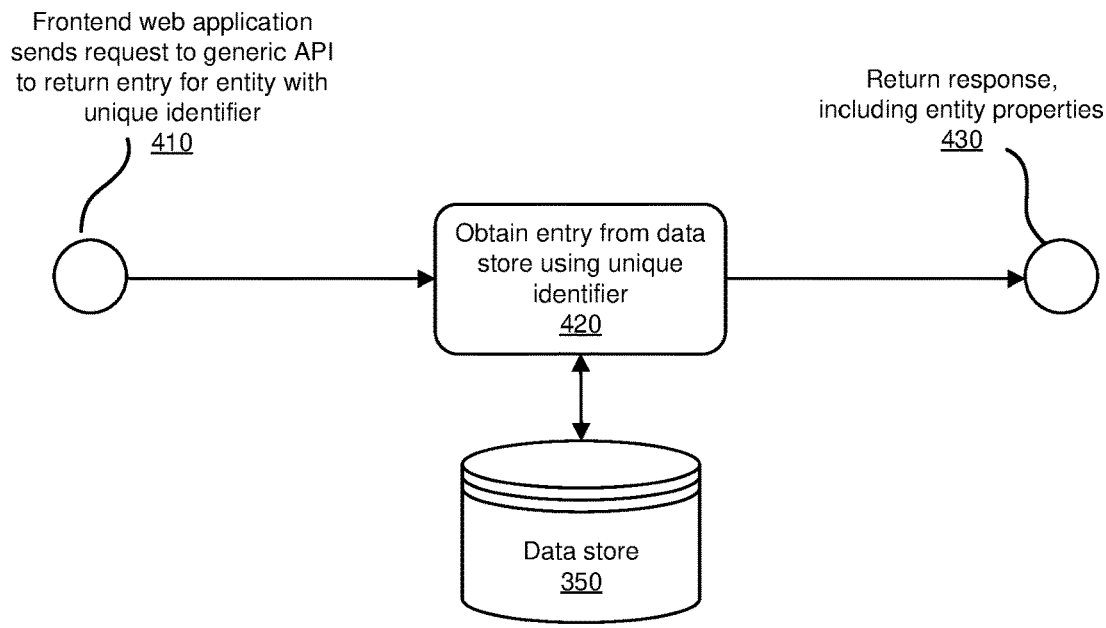
FIG. 4 is a diagram depicting an example service flow for returning entries for entities using a generic API.

FIG. 4 is a diagram depicting an example service flow 400 for returning entries for entities using a generic API (e.g., using generic API 131 or 231) of a simulation service (e.g., simulation service 130). The example service flow 400 begins when a frontend web application sends a request to the generic API to return an entry for an entity with a unique identifier, as depicted at 410. In response, the simulation service obtains the entry from the data store 350, as depicted at 420. The simulation service then returns the entry to the frontend web application along with the entity properties, as depicted at 430.

Figure 5:
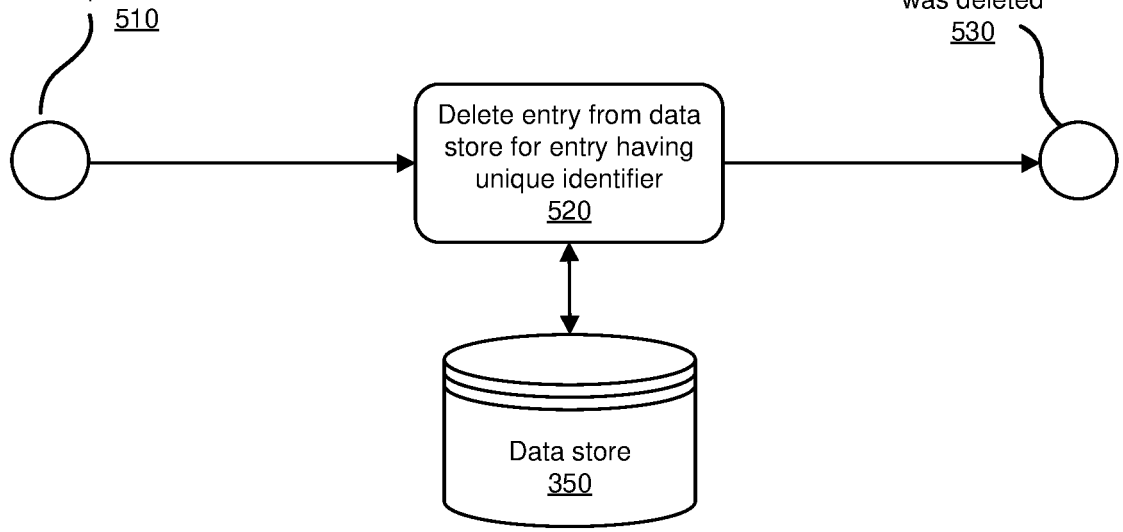
FIG. 5 is a diagram depicting an example service flow for deleting entries for entities using a generic API.

FIG. 5 is a diagram depicting an example service flow 500 for deleting entries for entities using a generic API (e.g., using generic API 131 or 231) of a simulation service (e.g., simulation service 130). The example service flow 500 begins when a frontend web application sends a request to the generic API to delete an entry for an entity with a unique identifier, as depicted at 510. In response, the simulation service deletes the entry from the data store 350, as depicted at 520. The simulation service then returns a response to the frontend web application indicating that the entry for the entity has been deleted, as depicted at 530.

Methods for Simulating Requests to Backend Applications Using a Simulation Service In the technologies described herein, methods can be provided for simulating requests to a backend application using a simulation service that exposes a generic API. Using the generic API, frontend web applications can send requests to the simulation service to perform actions for entities (e.g., for performing create, read, update, and delete (CRUD) operations).

Figure 6:
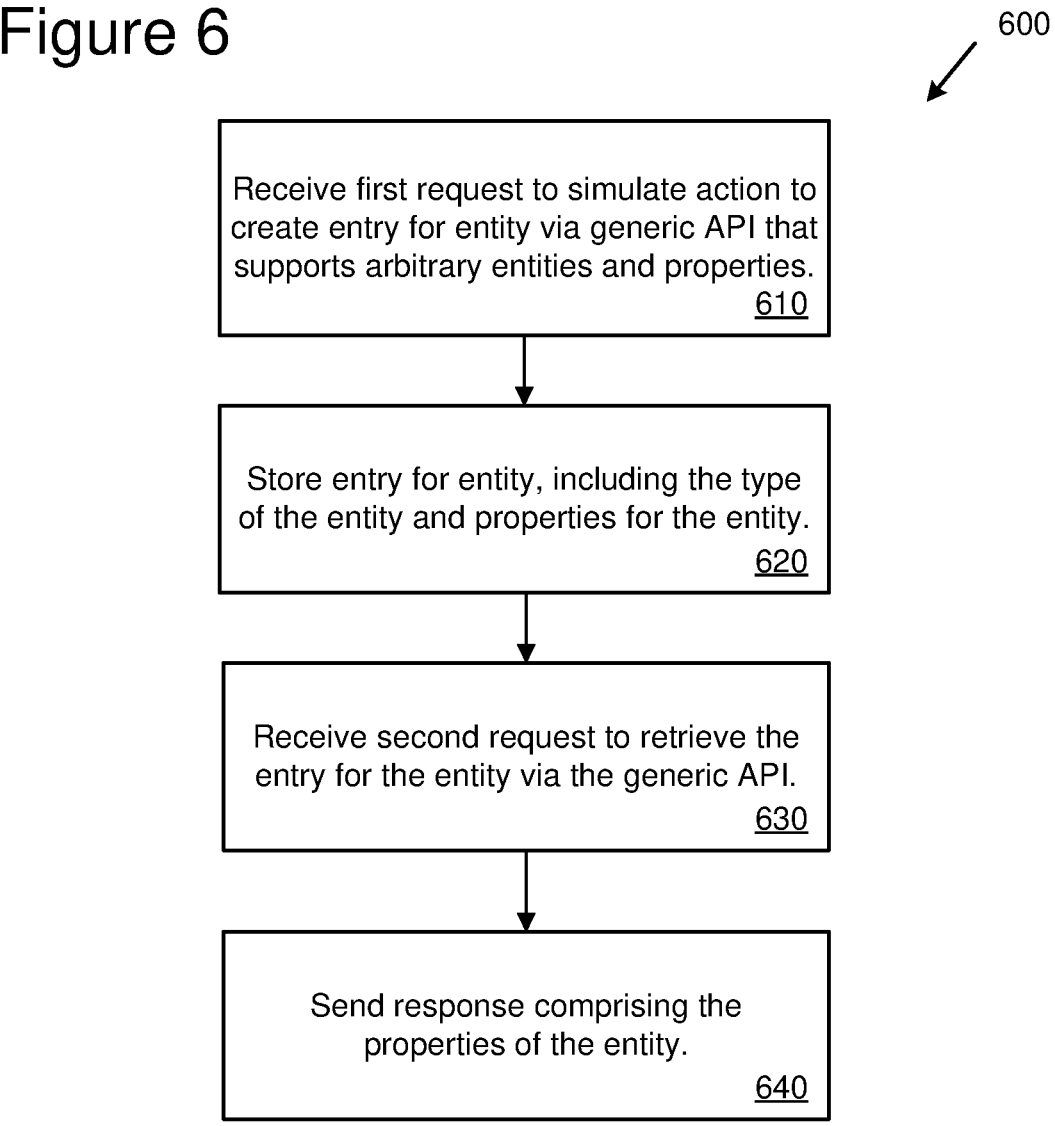
FIG. 6 is a flowchart of an example process for providing a simulation service with a generic API that simulates requests using to a backend application to create and return entries for entities.

FIG. 6 is a flowchart depicting an example process 600 for providing a simulation service with a generic API that simulates requests to a backend application. At 610, a first request is received to simulate an action to create an entry for an entity. The first request comprises a type of the entity to be created along with one or more properties of the entity. The first request is received by a simulation service via a generic API (e.g., by simulation service 130). The generic API supports arbitrary entities and arbitrary properties, and does not use definitions of predefined entities or properties.

At 620, the entry for the entity is stored, including the type of the entity and the properties for the entity. The entry is stored in a data store (e.g., a relational database or another type of data store). In some implementations, a unique identifier is generated and stored for the entry.

At 630, a second request is received to retrieve the entry for the entity. The second request is received from the frontend web application via the generic API. In some implementations, the second request comprises a unique identifier of the entry for the entity, which is used to retrieve the entry from the data store.

At 640, in response to the second request, the properties of the entity are sent to the frontend web application. For example, the properties can be provided in an HTTP response body.

Figure 7:
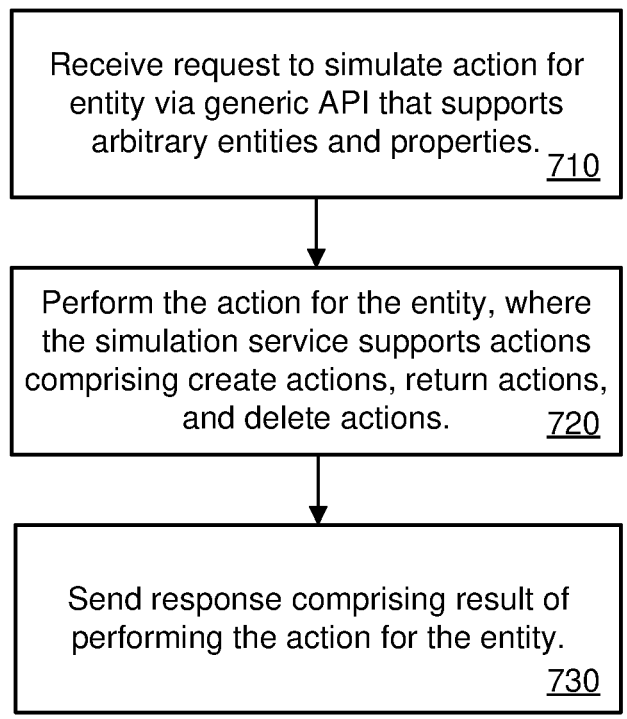
FIG. 7 is a flowchart of an example process for providing a simulation service with a generic API that simulates requests to a backend application.

FIG. 7 is a flowchart depicting an example process 700 for providing a simulation service with a generic API that simulates requests to a backend application. At 710, a request is received to simulate an action for an entity. The request comprises an indication of the action to be performed. The request is received by a simulation service via a generic API (e.g., by simulation service 130). The generic API supports arbitrary entities and arbitrary properties, and does not use definitions of predefined entities or properties.

At 720, the action for the entity is performed by the simulation service. The simulation service supports actions comprising create actions, return actions, and delete actions.

At 730, a response is sent to the frontend web application comprising results of performing the action for the entity.

Computing Systems

Figure 8:
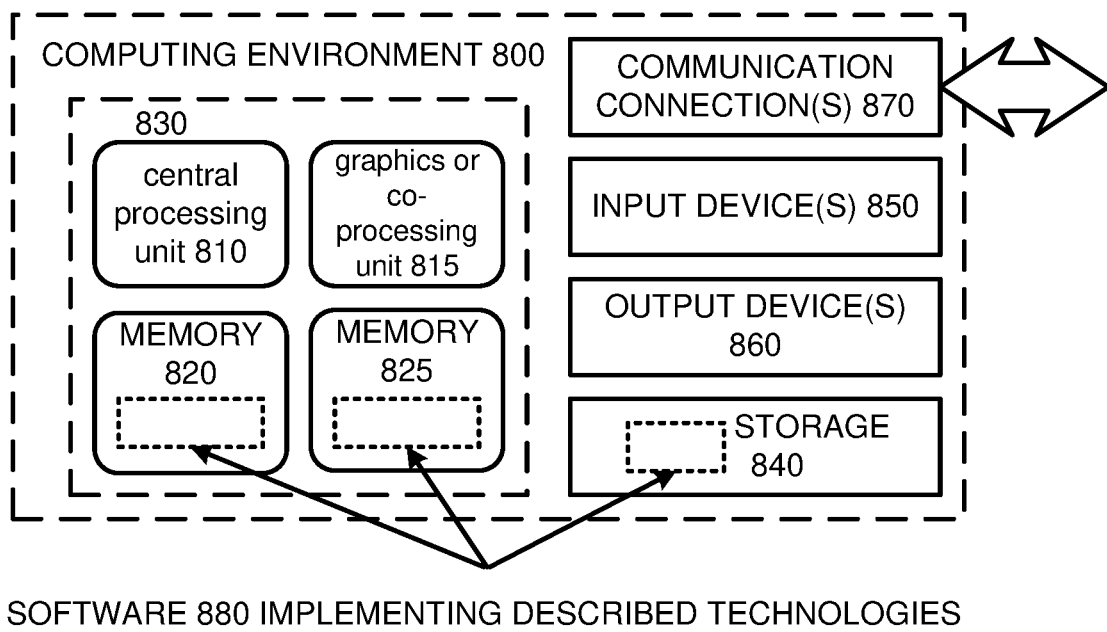
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 9:
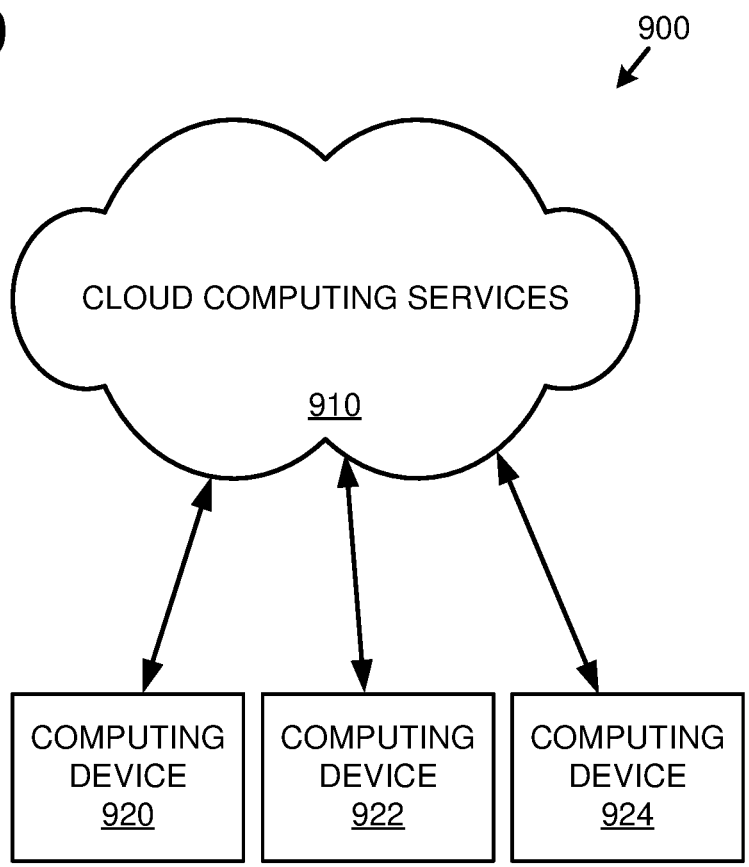
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, database resources, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections, such as 870.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, to provide a simulation service with a generic application programming interface (API) that simulates requests to a backend application, the method comprising:
   receiving, at the simulation service from a frontend web application, a first request to simulate an action to create an entry for an entity, wherein the first request is received via the generic API provided by the simulation service, and wherein the first request comprises:
      a type of the entity;
      one or more properties of the entity; and
      an indication of the action to create the entry for the entity;
   in response to the first request, storing the entry for the entity, comprising storing the type of the entity and the one or more properties of the entity in a data store;
   receiving, at the simulation service from the frontend web application, a second request to simulate an action to retrieve the entry for the entity, wherein the second request is received via the generic API provided by the simulation service;
   in response to the second request, sending a response to the frontend web application, the response comprising the one or more properties of the entity;
   wherein the simulation service is separate from the backend application; and
   wherein the simulation service and the generic API support arbitrary entities and arbitrary properties, and do not use definitions of predefined entities or properties.

2. The method of claim 1, further comprising:
   in response to the first request, determining a unique identifier that identifies the entry for the entity, wherein storing the entry for the entity further comprises:
      storing the unique identifier in association with the entry for the entity;
   in response to the first request, send a response to the frontend web application indicating that the entry for the entity was created and comprising the unique identifier.

3. The method of claim 2, wherein the second request comprises the unique identifier that identifies the entry of the entity.

4. The method of claim 1, wherein the first and second requests are hypertext transfer protocol (HTTP) requests, and wherein the type of the entity is received in a path segment of a uniform resource locator (URL) of the first request.

5. The method of claim 1, wherein the generic API is hosted as a representational state transfer (RESTful) web service, wherein the first and second requests are hypertext transfer protocol (HTTP) requests, and wherein the type of the entity is received in a path segment of a uniform resource locator (URL) of the first and second requests.

6. The method of claim 1, wherein the generic API is hosted as a representational state transfer (RESTful) web service, wherein the first and second requests are hypertext transfer protocol (HTTP) requests, wherein the indication of the action to create the entry for the entity is determined by a request method of the first request, and wherein different actions are associated with different request methods.

7. The method of claim 6, wherein the simulation service supports request methods comprising:
  hypertext transfer protocol (HTTP) GET request methods for retrieving entries for entities;
  HTTP POST request methods for creating new entries for entities; and
  HTTP DELETE request methods for deleting entries for entities.

8. The method of claim 1, wherein the simulation service is configured to store multiple entries for respective multiple entities having a same type, and wherein each of the multiple entries supports arbitrary parameters independent of other entries having the same type.

9. The method of claim 1, further comprising:
  receiving, at the simulation service from the frontend web application, a third request to simulate an action to delete the entry for the entity, wherein the third request is received via the generic API provided by the simulation service;
  in response to the third request, deleting the entry for the entity from the data store.

10. The method of claim 1, further comprising:
  receiving, at the simulation service from a frontend web application, a third request to simulate an action to create a second entry for a second entity, wherein the third request is received via the generic API provided by the simulation service, and wherein the third request comprises:
    the type of the second entity, wherein the type of the second entity is a same type as the type of the first entity;
    one or more properties of the second entity, wherein at least one of the one or more properties of the second entity is different from the one or more properties of the entity; and
    an indication of the action to create the second entry for the second entity;
  in response to the third request, storing the second entry for the second entity, comprising storing the second type of the second entity and the one or more properties of the second entity in the data store.

11. The method of claim 1, wherein the simulation service simulates requests that test the frontend web application instead of sending requests to the backend application.

12. One or more computing devices comprising:
  processors; and
  memory;
  the one or more computing devices configured, via computer-executable instructions, to provide a simulation service with a generic application programming interface (API) that simulates requests to a backend application, the operations comprising:
    receiving, at the simulation service from a frontend web application, a first request to simulate an action to create an entry for an entity, wherein the first request is received via the generic API provided by the simulation service, and wherein the first request comprises:
      a type of the entity;
      one or more properties of the entity; and
      an indication of the action to create the entry for the entity;
    in response to the first request, storing the entry for the entity, comprising storing the type of the entity and the one or more properties of the entity in a data store;
    receiving, at the simulation service from the frontend web application, a second request to simulate an action to retrieve the entry for the entity, wherein the second request is received via the generic API provided by the simulation service;
    in response to the second request, sending a response to the frontend web application, the response comprising the one or more properties of the entity;
    wherein the simulation service is separate from the backend application; and
    wherein the simulation service and the generic API support arbitrary entities and arbitrary properties, and do not use definitions of predefined entities or properties.

13. The one or more computing devices of claim 12, the operations further comprising:
  in response to the first request, determining a unique identifier that identifies the entry for the entity, wherein storing the entry for the entity further comprises:
    storing the unique identifier in association with the entry for the entity;
  in response to the first request, send a response to the frontend web application indicating that the entry for the entity was created and comprising the unique identifier.

14. The one or more computing devices of claim 13, wherein the second request comprises the unique identifier that identifies the entry of the entity.

15. The one or more computing devices of claim 12, wherein the first and second requests are hypertext transfer protocol (HTTP) requests, and wherein the type of the entity is received in a path segment of a uniform resource locator (URL) of the first request.

16. The one or more computing devices of claim 12, wherein the simulation service supports request methods comprising:
  hypertext transfer protocol (HTTP) GET request methods for retrieving entries for entities;
  HTTP POST request methods for creating new entries for entities; and
  HTTP DELETE request methods for deleting entries for entities;
  HTTP PATCH request methods for updating only sent properties of entries for entities; and
  HTTP PUT request methods for updating all properties for entries for entities.

17. One or more computer-readable storage media storing computer-executable instructions for execution on one or more computing devices to perform operations for providing a simulation service with a generic application programming interface (API) that simulates requests to a backend application, the operations comprising:
- receiving, at the simulation service from a frontend web application, a request to simulate an action for an entity, wherein the request is received via the generic API provided by the simulation service, wherein the request comprises:
    - an indication of the action to perform for the entity;
- performing the action for the entity, wherein the action is one of a plurality of actions supported by the simulation service, the supported actions comprising:
    - a create action that creates and stores an entry for the entity in a data store, the entry comprising properties of the entity;
    - a return action that returns the entry for the entity, including the properties of the entity; and
    - a delete action that deletes the entry for the entity from the data store;
- sending a response to the frontend web application comprising a result of performing the action for the entity;
- wherein the simulation service is separate from the backend application; and
- wherein the simulation service and the generic API support arbitrary entities and arbitrary properties, and do not use definitions of predefined entities or properties.

18. The one or more computer-readable storage media of claim 17, wherein the action is the create action, wherein the request further comprises the properties of the entity, and wherein performing the action for the entity comprises:
- generating a unique identifier that identifies the entry for the entity; and
- storing the entry for the entity in the data store in association with the unique identifier;
- wherein the response sent to the frontend web application comprises the unique identifier that identifies the entry created for the entity.

19. The one or more computer-readable storage media of claim 17, wherein the action is the return action, wherein the request further comprises a unique identifier that identifies the entry for the entity, and wherein performing the action for the entity comprises:
- obtaining the entry, including the properties, for the entity from the data store using the unique identifier;
- wherein the response sent to the frontend web application comprises the properties for the entity.

20. The one or more computer-readable storage media of claim 17, the supported actions further comprising:
- a return all action that returns all entries for entities having a same type.

* * * * *